United States Patent
Elgersma et al.

(10) Patent No.: US 10,540,785 B2
(45) Date of Patent: Jan. 21, 2020

(54) COMPRESSING DATA POINTS INTO POLYGONS

(71) Applicant: Honeywell International Inc., Morris Plains, NJ (US)

(72) Inventors: Michael Ray Elgersma, Plymouth, MN (US); Benjamin Mohr, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 62 days.

(21) Appl. No.: 15/993,294

(22) Filed: May 30, 2018

(65) Prior Publication Data

US 2019/0371007 A1    Dec. 5, 2019

(51) Int. Cl.
G06T 9/00    (2006.01)
G06T 15/08   (2011.01)

(52) U.S. Cl.
CPC .............. *G06T 9/00* (2013.01); *G06T 15/08* (2013.01); *G06T 2210/56* (2013.01)

(58) Field of Classification Search
None
See application file for complete search history.

(56) References Cited

U.S. PATENT DOCUMENTS

| | | |
|---|---|---|
| 6,452,596 B1 | 9/2002 | Gueziec et al. |
| 7,804,498 B1 | 9/2010 | Graham et al. |
| 8,290,305 B2 * | 10/2012 | Minear ............... G06T 7/32 |
| | | 345/629 |
| 9,390,556 B2 | 7/2016 | Masry |
| 9,753,124 B2 | 9/2017 | Hayes |
| 9,787,321 B1 | 10/2017 | Hemmer et al. |
| 2007/0195383 A1 * | 8/2007 | Yoon ................ H04N 1/62 |
| | | 358/518 |

(Continued)

OTHER PUBLICATIONS

Bageshwar et al, "Multi-Intruder Aircraft, Multi-Sensor Tracking System", "34th Digital Avionics Systems Conference, Sep. 13-17, 2015", pp. 5A5-1-5A5-13, Publisher: IEEE.

(Continued)

*Primary Examiner* — Sarah Le
(74) *Attorney, Agent, or Firm* — Fogg & Powers LLC

(57) ABSTRACT

A method for compressing three-dimensional data points is disclosed. The method includes measuring a plurality of three-dimensional data points using one or more sensors communicatively coupled to the computing device, where each three-dimensional data point represents a point in a three-dimensional environment. The method also includes dividing the three-dimensional environment into a plurality of spatial cubes, wherein each three-dimensional data point is mapped to one spatial cube. The method also includes, for each spatial cube, converting the three-dimensional data points in the respective spatial cube to a two-dimensional plane based on a number of three-dimensional data points in the respective spatial cube. The method also includes, for each two-dimensional plane, determining polygon vertices of a planar polygon at points where an edge of an associated spatial cube intersects the respective two-dimensional plane. The method also includes sending the polygon vertices of each planar polygon to a ground station.

20 Claims, 7 Drawing Sheets

(56) References Cited

U.S. PATENT DOCUMENTS

| | | | | |
|---|---|---|---|---|
| 2014/0267614 A1* | 9/2014 | Ding | ........................ | G06T 17/10 |
| | | | | 348/46 |
| 2015/0138310 A1* | 5/2015 | Fan | .................... | G06K 9/00201 |
| | | | | 348/36 |
| 2017/0109932 A1* | 4/2017 | Fujimoto | .............. | G01S 17/023 |

OTHER PUBLICATIONS

Isenburg, "Compression and Streaming of Polygon Meshes", "Dissertation submitted to the faculty of the University of North Carolina at Chapel Hill", Dated 2005, Total pp. 217.

Scherer et al, "Flying Fast and Low Among Obstacles: Methodology and Experiments", "The International Journal of Robotics Research", dated May 2008, pp. 549-574, vol. 27, No. 5, Publisher: SAGE Publications.

Siew et al, "Simultaneous Localization and Mapping with Moving Object Tracking in 3D Range Data", "American Institute of Aeronautics and Astronautics", Dated 2018, pp. 1-24.

* cited by examiner

COMPRESSING DATA POINTS INTO POLYGONS

When large point clouds are generated to map a three-dimensional (3D) environment, the resulting set (e.g., hundreds of thousands or millions) of data points may be too large to store or transmit efficiently. Therefore, there is a need for systems and methods for compressing a large point cloud into a more sparse representation that still accurately represents the 3D environment.

SUMMARY

A method for compressing three-dimensional data points, performed by a computing device, is disclosed. The method includes measuring a plurality of three-dimensional data points using one or more sensors communicatively coupled to the computing device, where each three-dimensional data point represents a point in a three-dimensional environment. The method also includes dividing the three-dimensional environment into a plurality of spatial cubes, wherein each three-dimensional data point is mapped to one spatial cube. The method also includes, for each spatial cube, converting the three-dimensional data points in the respective spatial cube to a two-dimensional plane based on a number of three-dimensional data points in the respective spatial cube. The method also includes, for each two-dimensional plane, determining polygon vertices of a planar polygon at points where an edge of an associated spatial cube intersects the respective two-dimensional plane. The number of polygon vertices for the three-dimensional environment is less than the number of three-dimensional data points measured in the three-dimensional environment. The method also includes sending the polygon vertices of each planar polygon to a ground station.

BRIEF DESCRIPTION OF THE DRAWINGS

Embodiments of the present invention can be more easily understood and further advantages and uses thereof more readily apparent, when considered in view of the description of the preferred embodiments and the following figures in which.

DETAILED DESCRIPTION

Figure 1:
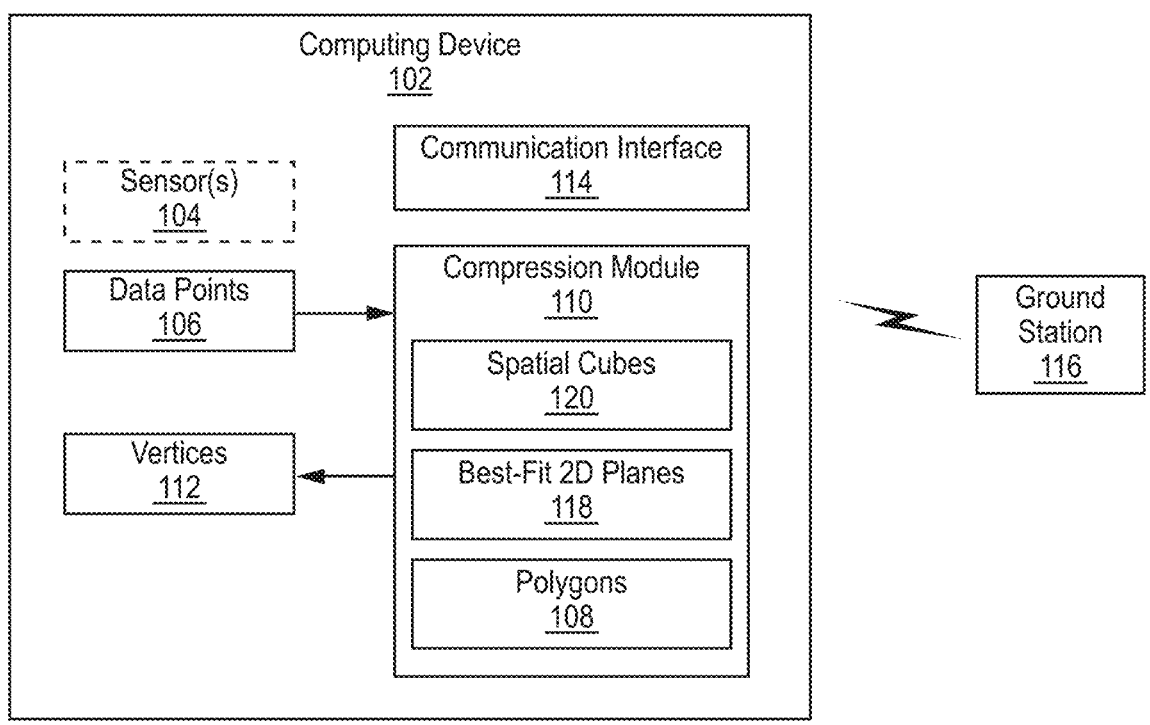
FIG. 1 is a block diagram illustrating an example computing device for compressing data points into polygons.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Three-dimensional imaging may seek to generate a representation of a 3D environment. This may include periodically measuring a point cloud (i.e., sets of thousands or millions of data points). If a new point cloud is measured every second, then a low-data-rate radio may not achieve enough throughput to send all the data points before the next data set is ready, i.e., the 3D data points are measured faster than they can be transmitted. Therefore, there is a need for systems and methods of reducing the amount of data in a representation of a 3D environment before sending the data out over a radio.

Accordingly, systems and methods for compressing data points into polygons are disclosed herein. The compression includes taking a large number of 3D data points and approximating them with far fewer 2D planar polygons, e.g., by mapping the 3D data points to spatial cubes, approximating a best-fit 2D plane (for each spatial cube) that includes the 3D data points in the respective spatial cube, and trimming each best-fit 2D plane where it intersects the boundaries of the respective spatial cube to produce planar polygons. The point cloud may then be represented by the vertices of the resulting polygons instead of the 3D points. Furthermore, the present systems and methods do not need to compute connectivity between neighboring polygons.

The 3D points in each spatial cube may also be thresholded, e.g., planar polygons may be approximated only for spatial cubes that include at least a threshold (minimum) number of 3D data points, e.g., 50. By representing the 3D environment using the vertices of the planar polygon (instead of the 3D data points), the amount of data needed to represent the 3D environment may be greatly reduced, since many (e.g., 50 or more) data points are replaced by only three to six vertices of the planar polygon that best fits those data points. This may provide a reasonable representation of the 3D environment, since the 3D points come from a sensor measuring a 2D surface of 3D object, e.g., the walls of a 3D building are 2D surfaces.

Therefore, the present systems and methods provide an improvement to the field of compressing data points into polygons, i.e., they represent a 3D environment accurately with a reduced set of data, which can be transmitted in real-time (or near real-time) to a ground station. Real-time (or near real-time) transmittal of the data can enable real-time (or near real-time) imaging of the 3D environment, which is advantageous in various situations. For example, emergency responders may be able to make an informed decision about the safety of an environment without waiting for a mobile robot to return to the ground station. Alternatively, or additionally, a vehicle may be navigated (with or without user input) based on the real-time (or near real-time) imaging of the 3D environment.

Furthermore, the present systems and methods improve the functioning of a computing device because they use less processing and memory resources when compressing data points into polygons compared to other approaches. Specifically, the compression reduces the dimensionality in each spatial cube from a set of 3D points to a 2D polygon and doesn't require computing connectivity between neighboring polygons. Accordingly, the present systems and methods may be faster and use less processing and memory resources than conventional techniques.

For pedagogical purposes the techniques herein are discussed in terms of spatial geometric shapes, e.g., spatial cubes, planes, polygons, etc. However, it is understood that each of the spatial geometric shapes discussed herein may be represented and transformed mathematically. Therefore, it is understood that any geometric shapes or transformations described herein may be implemented using a corresponding mathematical expression and/or operation.

FIG. 1 is a block diagram illustrating an example computing device 102 for compressing data points 106 into polygons 108. The computing device 102 may be implemented as any of a mobile computing device, such as a mobile phone, tablet computer, mobile media device, mobile gaming device, laptop computer, vehicle-based computer, etc.; or a non-mobile device such as a dedicated terminal, a public terminal, a kiosk, a server, or a desktop computer. The computing device 102 may be implemented using one or more processors (in one or more physical devices) executing instructions stored in memory.

The computing device 102 may be any device that measures and/or compresses data characterizing a 3D environment. For example, the computing device 102 may be sent into a physical location that is unsafe and/or physically impractical for humans to enter, e.g., underground and/or underwater caves, tunnels, pipes, etc. Alternatively, the computing device 102 may compress (and optionally measure) data characterizing the inside or outside of a building, e.g., mounted on a car that drives streets in a city.

The computing device 102 may be a component of and/or physically located in an autonomous vehicle, an unmanned vehicle that is remotely controlled from a ground station 116, or a passenger-operated vehicle. The vehicle may take the form of an airplane 118, helicopter, space borne vehicle, automobile, truck, train, ship, submarine, etc. Alternatively, the computing device 102 may be a component of and/or physically located in a fixed/stationary system, such as a standalone sensor or a system of sensors. The ground station 116 may be implemented using one or more electronic devices that are physically remote from, and in communication with, the computing device 102.

Optionally, the computing device 102 may include one or more sensors 104. The sensor(s) 104 may use any surveying technology that measures data points in a 3D environment. For example, the sensor(s) 104 may be part of a 3D light detection and ranging (LIDAR) system, e.g., with a range of approximately 100 yards. Alternatively, the sensor(s) 104 may be part of a high-power LIDAR system, e.g., with a range much greater than 100 yards. Alternatively, the sensor(s) 104 may be one or more camera(s) configured to measure data points 106 in a 3D environment. Alternatively, the sensor(s) 104 may be included in a physically separate device than the computing device 102 and transmit the measured data points 106 to the computing device 102.

Each measured data point 106 may characterize a point in a 3D environment. Each data point 106 may have no specified association with the other data points 106 when first measured. Each data point 106 may be represented as a vector originating at the sensor(s) 104 and having end coordinates in a Cartesian coordinate system, i.e., x,y,z. The units of each data point 106 may be in terms of distance from the sensor(s) 104 measuring the data point 106. For example, a first data point 106 may have coordinates (20, −35, 14), e.g., where each value represents centimeters, inches, feet, meters, yards, kilometers, miles or other units in the x, y, and z direction from the measuring sensor(s) 104, respectively. In some configurations, the sensor(s) 104 may measure data points 106 while the computing device 102 is moving.

The sensor(s) 104 may periodically (e.g., every second, every two seconds, or fraction of a second) measure a new set of data points 106. The time period during which a set of data points 106 is measured may be referred to as a "measurement window." The sensor(s) 104 may measure many (e.g., hundreds of thousands or millions) of data points 106 in each measurement window.

The ground station 116 may rely on data from the computing device 102 to generate images of the 3D environment. In one configuration, the computing device 102 may measure data points 106 across many (e.g., minutes or hours worth) measurement windows, but wait to communicate the measured data points 106 until the computing device physically returns to the ground station 116 (or other location). However, such a wait may be undesirable in some situations, e.g., emergency situations.

Another possible implementation is to attempt to transmit all the data points 106 as they are measured. However, it may be impractical and/or impossible to transmit all the measured data points 106 to the ground station 116, e.g., because a communication interface 114 on the computing device 102 may use a limited-bandwidth connection to the ground station 116. For example, the communication interface 114 may use Wi-Fi, Bluetooth, cellular (3G, LTE or 5G), satellite, ZigBee, Z-Wave, or any other suitable wireless communication protocol. Furthermore, even if the communication interface 114 is capable of a high enough possible throughput to transmit all the data points 106 as fast as they are measured, the computing device 102 may be located in a physical location that limits the realized throughput of the communication interface 114, e.g., underground, underwater, etc.

Therefore, in the present systems and methods, the computing device 102 may use a compression module 110 to compress the data points 106 into polygons 108. It should be noted that the data points 106 may not be compressed within the same measurement window as they are measured. However, in some configurations, only data points 106 measured within the same measurement window may be compressed and/or transmitted together.

The compression of data points 106 may include mapping each data point 106 to a spatial cube 120 in an evidence grid (i.e., a 3D grid of spatial cubes 120) that spans the entire 3D environment being measured by the sensor(s) 104. In other words, the 3D environment may be artificially divided into equal-sized spatial cubes 120 such that each measured data point 106 may be mapped to (associated with) one and only one spatial cube 120 (with the possible exception of data points 106 that are located on a boundary between two spatial cubes 120). Each spatial cube 120 may, therefore, include any number of (e.g., 0-200) data points 106. The spatial cubes 120 may be implemented in a 3D data structure (e.g., 3D matrix) in memory on the computing device 102.

Generally speaking, the average density of the spatial cubes 120 (i.e., average number of data points 106 per spatial cube 120) may depend on the size of the spatial cubes 120. Larger-sized spatial cubes 120 (e.g., 12"×12"×12") may require fewer spatial cubes 120, each having a higher average number of data points 106. Selecting a larger size for the spatial cubes 120 may produce a less accurate representation of the 3D environment, but less processing resources may be required for compression. In contrast, smaller-sized spatial cubes 120 (e.g., 2"×2"×2") may require more spatial cubes 120, each having a lower average number of data points. Selecting a smaller size for the spatial cubes 120 may produce a more accurate representation of the 3D environment, but greater processing resources may be required for compression. The size of the spatial cubes 120 may be configurable by a user at the ground station 116 and/or the computing device 102, e.g., using a user interface. Alternatively, the size of the spatial cubes 120 may be predefined. In one configuration, the size of the spatial cubes 120 may be configured based on processing and/or memory resources of the computing device 102. Alternatively, the size of the spatial cubes 120 may be configured based on a level of desired accuracy for the 3D imaging, acceptable lag time of the 3D imaging, and/or available bandwidth/throughput of the communication interface 114.

The sensor(s) 104 may measure a small number of data points 106 that are noise. For example, the sensor(s) 104 may measure occasional data points 106 from air particles, such as dust. It may be desirable to discard such data points 106 to avoid wasting resources required to compress them and transmit data associated with them. Accordingly, the compression module 110 may threshold the spatial cubes 120. Specifically, the compression module 110 may determine which spatial cubes 120 include at least a minimum number of data points 106, e.g., 20, 50, etc. Selecting a higher threshold (e.g., 100) may use relatively low processing resources and transmission bandwidth (since fewer data points 106 will need to be compressed). In contrast, selecting a lower threshold (e.g., 5) may use relatively high processing resources and transmission bandwidth (since more data points 106 will need to be compressed).

The minimum number may be may be configurable by a user at the ground station 116 and/or the computing device 102, e.g., using a user interface. Alternatively, the minimum number may be predefined. The minimum threshold may be configured based on processing and/or memory resources of the computing device 102, a level of desired accuracy for the 3D imaging, acceptable lag time of the 3D imaging, and/or available bandwidth/throughput of the communication interface 114. In some configurations, the minimum threshold may be selected based on the size of the spatial cubes 120. For example, the computing device 102 may require relatively small values (e.g., less than 10) for the minimum threshold when relatively small spatial cubes 120 are used (e.g., 2"×2"×2"). Conversely, the computing device 102 may require relatively large values (e.g., between 20 and 50) for the minimum threshold when relatively large spatial cubes 120 are used (e.g., 12"×12"×12"). Additionally, or alternatively, the minimum threshold may be selected based on air conditions in the 3D environment, e.g., a lower minimum threshold may be chosen for conditions with smoky, foggy, hazy, and/or dusty air, while a higher minimum threshold may be chosen for relatively clean/particle-less air conditions.

Following thresholding, a best-fit two-dimensional (2D) plane 118 may be approximated for the data points 106 in each spatial cube 120 that includes at least the minimum number of data points 106. In other words, for each spatial cube 120, a best-fit 2D plane 118 that includes the data points 106 in the respective spatial cube 120 may be estimated, as closely as possible. Therefore, a best-fit 2D plane 118 may be approximated for each spatial cube 120. Each best-fit 2D plane 118 may be approximated using a linear least squares algorithm.

This reduction in dimensionality (from 3D data points 106 in a spatial cube 120 to a best-fit 2D plane 118) may be one of the ways that the amount of data following compression is reduced compared to the measured data points 106. It should be noted that each best-fit 2D plane 118 may not be a perfect approximation of the data points 106, but will typically be adequate for representing a surface, e.g., a portion of a wall of tunnel, cave, building, object, etc.

At this stage, each best-fit 2D plane 118 may be represented as an infinite plane in two directions. Accordingly, each best-fit 2D plane 118 may be trimmed where it intersects its respective spatial cube 120, thus producing a 2D polygon 108 for each spatial cube 120. The terms "2D polygon," "planar polygon" and "polygon" may be used interchangeably to refer to a two-dimensional shape with at least three edges. Each polygon 108 may have anywhere from three to six edges, and therefore, three to six vertices 112. Each vertex 112 may be represented as a vector originating at the sensor(s) 104 and having end coordinates in a Cartesian coordinate system (x,y,z). The units of each vertex 112 may be in terms of distance from the sensor(s) 104 measuring the data point 106.

In some configurations, the vertices 112 may be determined (and truncation implicitly performed) by determining, for each best-fit 2D plane 118, vertices 112 of polygon 108 (lying within the best-fit 2D plane 118) at points where an edge of an associated spatial cube 120 intersects the best-fit 2D plane 118. In other words, the vertices 112 may be determined directly from the best-fit 2D plane 118.

The vertices 112 of each polygon 108 may be transmitted to the ground station 116 instead of the data points 106. The ground station 116 may aggregate the received vertices 112 (e.g., across multiple measurement windows and/or polygons 108) to create a real-time (or near real-time) 3D image of the 3D environment surrounding (or near) the computing device 102. The vertices 112 derived from the data points 106 measured during a first measurement window may be sent to the ground station 116 before a next measurement window is complete.

For each measurement window, the number of resulting vertices 112 (of the resulting polygons 108) may be far less than the number of data points 106 measured during the measurement window. For example, there may be 1/10 (or fewer) resulting vertices 112 than data points 106 measured during a measurement window, e.g., reduction by at least a factor of 10. Alternatively, the compression may produce a reduction factor of 50, 100, 200, 500, 1000, etc. Therefore, that the 3D environment may be represented with far less vertices 112 than measured data points 106.

Figure 2:
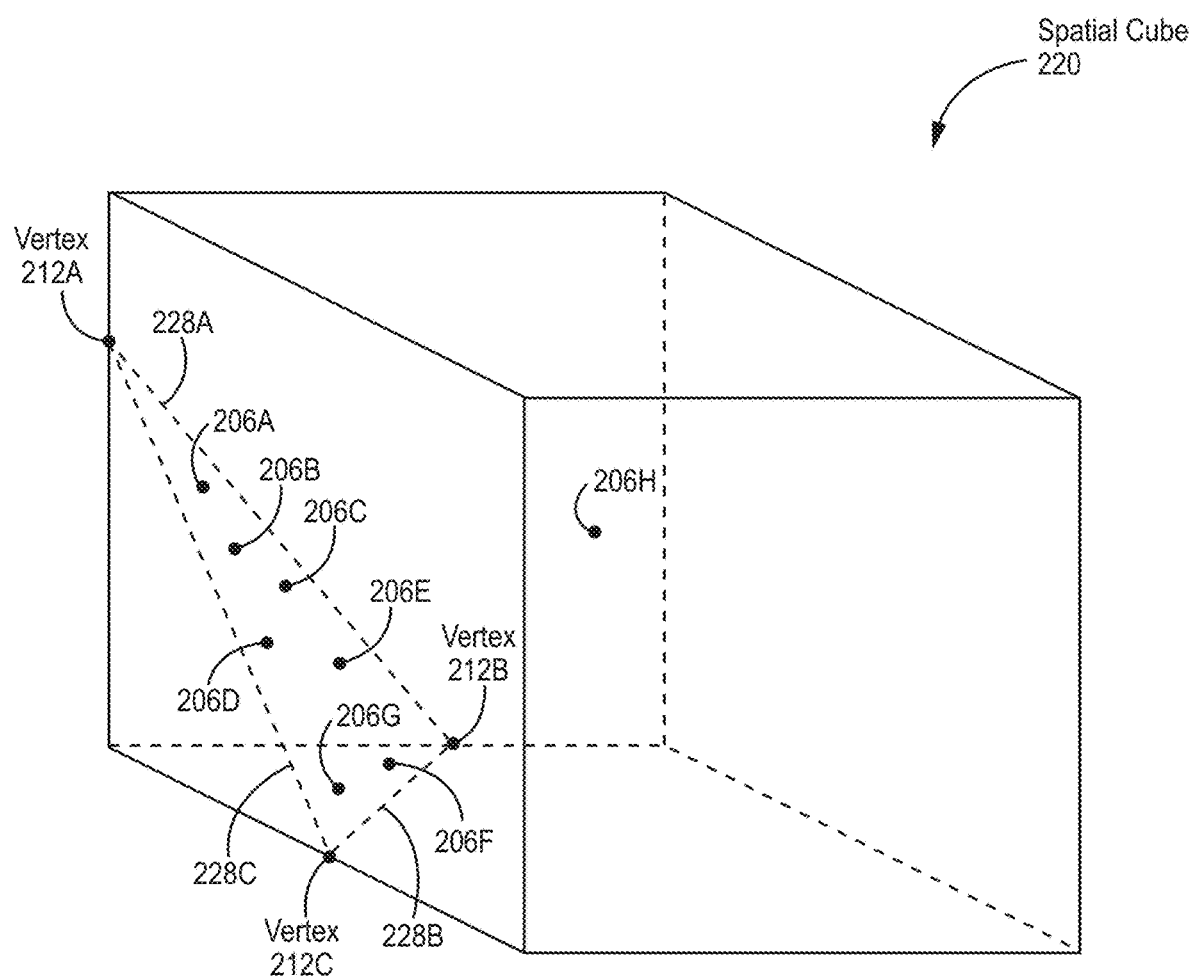
FIG. 2 is a diagram illustrating an example spatial cube.

FIG. 2 is a diagram illustrating an example spatial cube 220. The spatial cube 220 may be one of many (e.g., hundreds or thousands) spatial cubes 220 in a 3D grid of spatial cubes 220 that spans a 3D environment surrounding (or near) a computing device 102. The 3D environment may be a city street, the interior of a building, an underground and/or underwater cave, tunnel, or pipe, etc.

In order to obtain a 3D representation of the 3D environment, the computing device 102 may periodically measure a set of data points 206A-H in the 3D environment. For example, one or more sensor(s) 104 may measure hundreds of thousands or millions of data points 206 every second or fraction of a second, e.g., using LIDAR. Each data point 206 may be mapped to one and only one spatial cube 220 among many spatial cubes 220 (with the possible exception of data points 206 that are located on a boundary between two spatial cubes 220). Each spatial cube 220 may include any number of data points 206, e.g., anywhere from 0-1000 data points 206, depending on the size of the spatial cube 220 and the number of data points 206 measured.

For each spatial cube 220 containing a minimum number of data points 206, the computing device 102 may approximate a best-fit 2D plane 118 that includes the data points 206 in the respective spatial cube 220, as closely as possible.

Most data points 206A-G in the spatial cube 220 may lie in (or very close to) the best-fit 2D plane 118 for the spatial cube 220, but one or more data points 206H may not lie in the best-fit 2D plane 118. In other words, the best-fit 2D plane 118 may be an approximation of the data points 206, not a perfect representation. The best-fit 2D plane 118 may be approximated using a linear least squares algorithm.

Each best-fit 2D plane 118 may be trimmed (i.e., truncated) at the boundaries of the respective spatial cube 220, and vertices 212 may be determined for the resulting polygon 108. In one configuration, the vertices 212 may be determined (and truncation implicitly performed) by determining, for each best-fit 2D plane 118, vertices 212 of the polygon 108 (lying within the best-fit 2D plane 118) at points where an edge of an associated spatial cube 120 intersects the best-fit 2D plane 118. In other words, the vertices 212 may be determined directly from the best-fit 2D plane 118, e.g., without explicitly determining an intervening polygon 108.

Even though the polygon 108 is illustrated with three vertices 212A-C and three edges 228A-C in FIG. 2, each polygon 108 may include anywhere from three to six vertices 212A-C and three to six edges 228A-C, depending on how the best-fit 2D plane 118 intersects the boundaries of the spatial cube 220.

Figure 3:
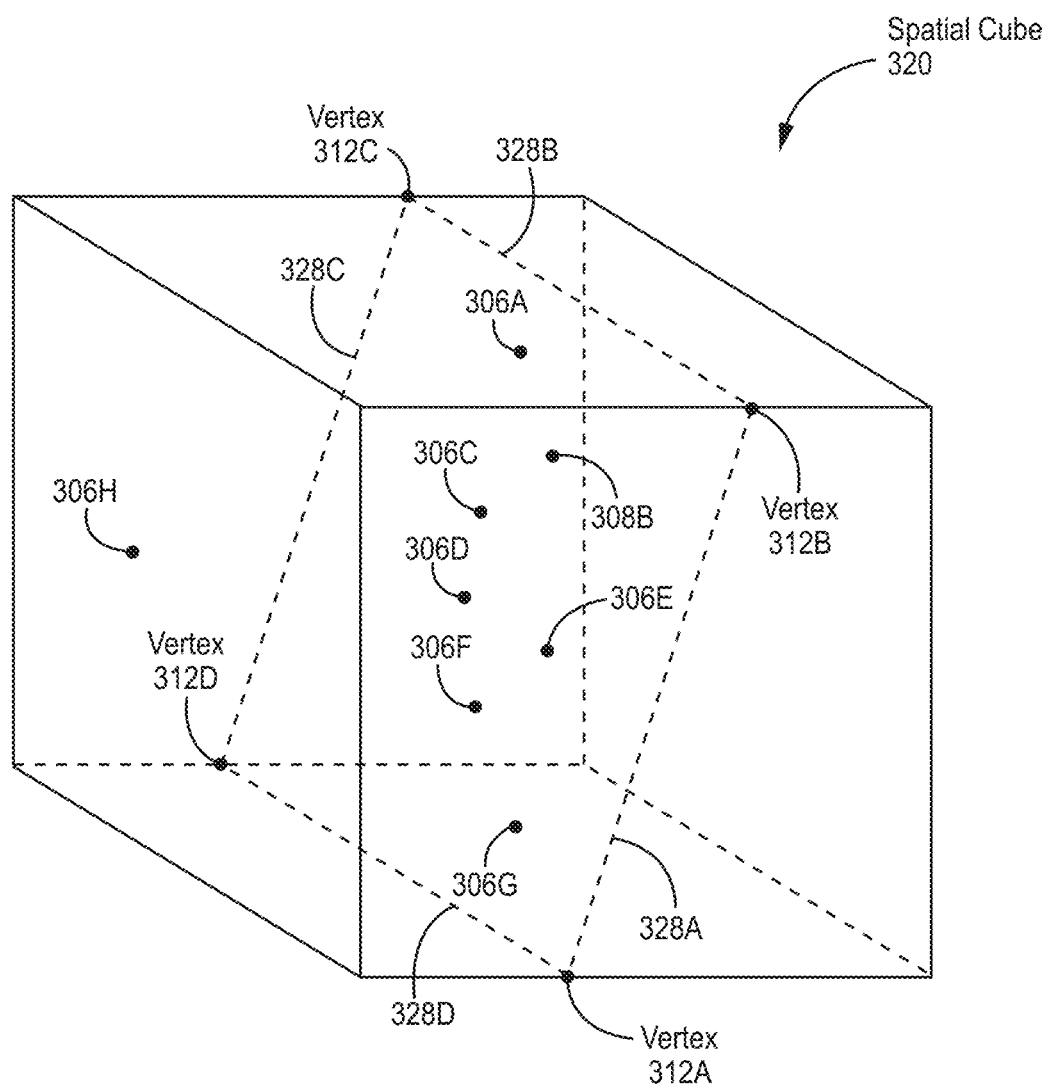
FIG. 3 is a diagram illustrating another example spatial cube.

FIG. 3 is a diagram illustrating another example spatial cube 320. Like the spatial cube 220 illustrated in FIG. 2, the spatial cube 320 may include any number of data points 306A-H, e.g., anywhere from 0-1000 data points 306A-H. However, the best-fit 2D plane 118 may intersect the spatial cube 320 differently than the spatial cube 220 illustrated in FIG. 2. Therefore, once the best-fit 2D plane 118 is trimmed, the resulting polygon 108 includes four vertices 312A-D and four edges 328A-D. Other configurations are possible where the resulting polygon 108 has five vertices 312 and five edges 328 or six vertices 312 and six edges 328. Most of the data points 306A-G in the spatial cube 320 may lie in (or very near) the best-fit 2D plane 118 approximated for the spatial cube 320, but one or more data points 306H may not lie in the best-fit 2D plane 118. Therefore, less than all of the data points 306 may lie in (or very near) the polygon.

Figure 4:
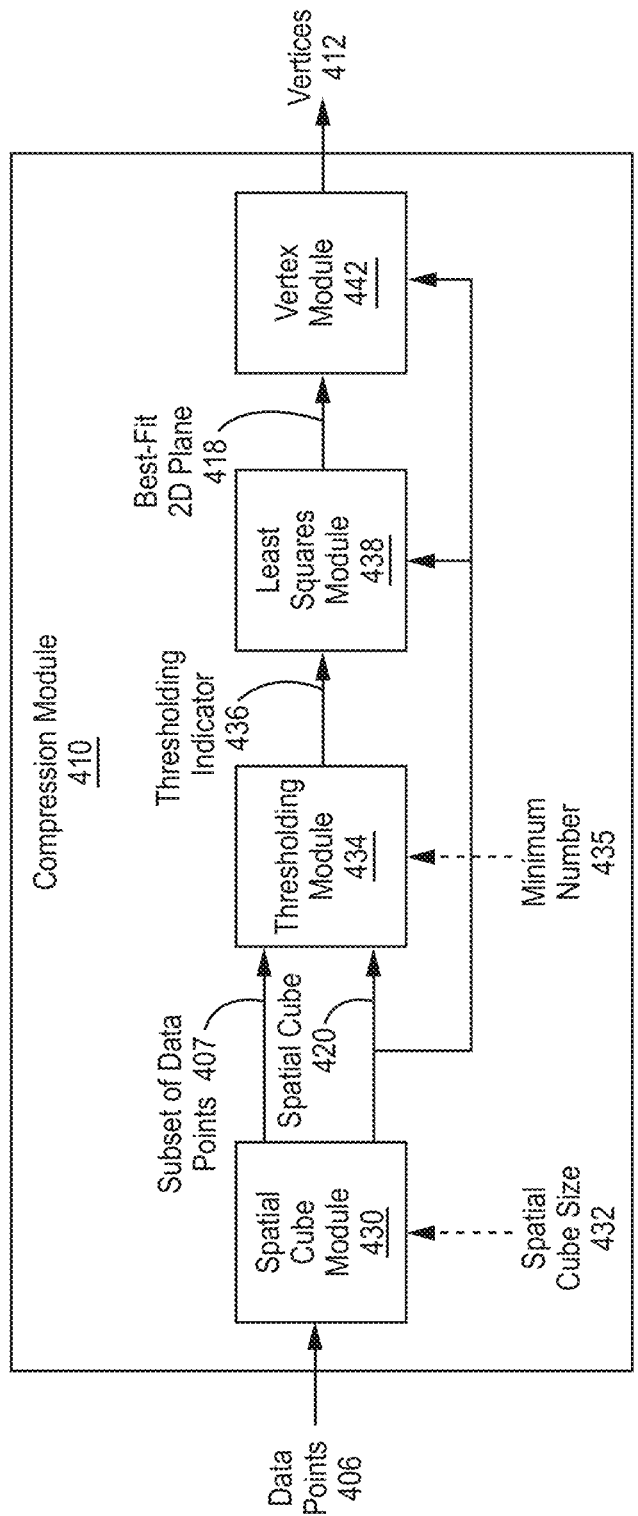
FIG. 4 is a block diagram illustrating an example compression module.

FIG. 4 is a block diagram illustrating an example compression module 410. The compression module 410 may be included in a computing device 102 that compresses (and optionally measures) data points 106 characterizing a 3D environment. The compression module 410 may be implemented with one or more processors (in one or more physical devices) executing instructions stored in memory.

The compression module 410 may receive (many, e.g., 1 million) data points 406 as input. The data points 406 may be measured periodically by one or more sensors 104, and each data point 406 may characterize a point in the 3D environment. Each data point 106 may be represented as a vector with an x, y, and z component.

A spatial cube module 430 may receive the (many, e.g., 1 million) data points 406 and may divide the 3D environment into many (e.g. 50×50×50) spatial cubes 420, some of which contain a subset of (e.g., 200) data points 407. The spatial cube module 430 may use a spatial cube size 432 to determine the number and size of the spatial cubes 420 used to represent the 3D environment. The spatial cube size 432 may be configurable based on user input or it may be predefined. The remaining modules in the compression module 410 may be described as operating on a single spatial cube 420 and a subset of data points 407 (i.e., the data points 406 in the particular spatial cube 420) at a time, however, it is understood that they may iteratively perform processing on many spatial cubes and many subsets of data points 407.

A thresholding module 434 may output a thresholding indicator 436 that indicates whether the spatial cube 420 includes at least a minimum number 435 of data points 406, e.g., 50. The minimum number 435 may be may be configurable by a user or predefined.

When the spatial cube 420 includes at least the minimum number 435 of data points 406, and only then, a least squares module 438 may approximate the data points 406 inside the spatial cube 420 with a best-fit 2D plane 418, e.g., using a linear least squares algorithm.

For example, 200 data points 406 inside a spatial cube 420 may be represented as [x(i),y(i),z(i)] where x(i) is the x coordinate of the ith data point 406, y(i) is the y coordinate of the ith data point 406, z(i) is the z coordinate of the ith data point 406, and i=1 to 200. The data points 406 in the spatial cube 420 may be fit to a 2D plane in 3D. Such a best-fit 2D plane 418 may have 4 parameters [a,b,c,d] (e.g., coefficients) used in the equation for a plane:

$$a*x(i)+b*y(i)+c*z(i)+d=0; \text{ for } i=1 \text{ to } 200.$$

These 200 equations may be solved in a least-square-error sense, i.e., by solving the following matrix equation:

$$M\begin{bmatrix} a \\ b \\ c \\ d \end{bmatrix} = \begin{bmatrix} 0 \\ 0 \\ \vdots \\ 0 \\ 0 \end{bmatrix}, \text{ where } M = \begin{bmatrix} x(1) & y(1) & z(1) & 1 \\ x(2) & y(2) & z(2) & 1 \\ \vdots & \vdots & \vdots & \vdots \\ x(199) & y(199) & z(199) & 1 \\ x(200) & y(200) & z(200) & 1 \end{bmatrix}$$

A singular-value decomposition of M may be computed, which is given by the product of three matrices: $M=U\Sigma V^T$ where U is a rotation matrix, $\Sigma$ is a scaling matrix, and $V^T$ is a rotation matrix (i.e., the transpose of matrix V) with 4 rows and 4 columns, i.e., the singular-value decomposition of a real matrix $M=U\Sigma V^T$ decomposes M into a rotation by matrix $V^T$, followed by a scaling by diagonal matrix $\Sigma$, followed by a rotation by matrix U. The singular value decomposition may be useful for computing which vectors get set to 0 by the M matrix, since any zeroes along the diagonals of the $\Sigma$ matrix will be applied to the corresponding columns of the V matrix.

The diagonal entries of the $\Sigma$ matrix are ordered as follows: $\Sigma_{1,1} > \Sigma_{2,2} > \Sigma_{3,3} > \Sigma_{4,4}$. Since $\Sigma_{4,4}$ (i.e., the entry in the fourth column and fourth row of the $\Sigma$ matrix) is the smallest entry of $\Sigma$, and it multiplies the fourth column of the V matrix, setting [a,b,c,d] equal to the fourth column of the V matrix results in the smallest value of $U\Sigma V^T[a,b,c,d]$. In other words, the values of the plane parameters [a,b,c,d] that minimize the error of the planar fit, may be given by the $4^{th}$ column of the V matrix. The equation of the resulting best-fit 2D plane 418 may then be: ax+by+cz+d=0.

It should be noted that since V is orthonormal, $V^T V$=a 4×4 identity matrix. So, with [a,b,c,d]=(4th column of V), we get $V^T[a,b,c,d]=[0,0,0,1]$. So, $\Sigma V^T[a,b,c,d]=\Sigma[0,0,0,1]=[0,0,0,\Sigma_{4,4}]$. So, $U\Sigma V^T[a,b,c,d]=$(4th column of U)$\Sigma_{4,4}$. Since U is orthonormal, each of its columns have a norm equal to 1, so the norm of $U\Sigma V^T[a,b,c,d]$ is equal to $\Sigma_{4,4}$, which may be very small when the subset of data points 407 nearly fit into the least-squares-fit plane 418.

Alternatively, if a spatial cube 420 does not include at least a minimum number 435 of data points 406, the least squares module 438 may not approximate a two-dimensional plane 418 for the spatial cube 420 and/or the data points 406 in the spatial cube 420 may be discarded.

Parts of the best-fit 2D plane 418 that extend outside the spatial cube 420 may be removed. The spatial cube may be defined by: $x_{min} \leq x \leq x_{max}$; $y_{min} \leq y \leq y_{max}$; $z_{min} \leq z \leq z_{max}$; where $x_{min}$, $y_{min}$, and $z_{min}$ represent the lower bounds of the spatial cube 420 in the x, y, and z directions, respectively; and $x_{max}$, $y_{max}$, and $z_{max}$ represent the upper bounds of the spatial cube 420 in the x, y, and z directions, respectively. The portion of the best-fit 2D plane 418 remaining after trimming/truncation may be referred to as a planar polygon 108.

A vertex module 442 may determine vertices 412 for a planar polygon 108 that lies within the best-fit 2D plane 418 (and thereby implicitly perform the truncation). Each vertex 412 of the polygon may be a point where the best-fit 2D plane 418 is intersected by any of the 12 edges of the spatial cube 420. Specifically, each edge of the spatial cube 420 is a line, given by the two equations for the two faces of the spatial cube 420 that intersect along that spatial cube 420 edge. Since each face of a spatial cube 420 is part of a plane, face(j) and face(k) of a spatial cube 420 may be represented by the following two planar equations with known coefficients $[a_j, b_j, c_j, d_j]$ and $[a_k, b_k, c_k, d_k]$:

$$a_j x + b_j y + c_j z + d_j = 0; \text{ and}$$

$$a_k x + b_k y + c_k z + d_k = 0.$$

The corresponding vertex 412 of the polygon may be computed by solving 3 linear equations in x,y,z:

$$\begin{bmatrix} a & b & c \\ a_j & b_j & c_j \\ a_k & b_k & c_k \end{bmatrix} \begin{bmatrix} x \\ y \\ z \end{bmatrix} = - \begin{bmatrix} d \\ d_j \\ d_k \end{bmatrix}$$

The x,y,z values give a vertex of the polygon, if $x_{min} \leq x \leq x_{max}$; $y_{min} \leq y \leq y_{max}$; $z_{min} \leq z \leq z_{max}$. Between three and six of the x,y,z values for the 12 edges may satisfy these inequality constraints, where a set of x,y,z values satisfying the constraints characterizes a vertex 412. If there are three vertices 412, the polygon 108 is a triangle, while six vertices 412 give a six-sided polygon 108.

The three to six vertices 412 of the polygon may be ordered, so that when the vertices 412 are connected in sequence, they form the planar polygon 108. The three to six vertices 412 may then represent all 200 3D data points 406 that were in the spatial cube 420, giving a large reduction in the amount of data. This reduced amount of vertices 412 (derived from data points 406 measured during a first measurement window) may be transmitted (e.g., by a low-data-rate radio) before the next set of vertices 412 (derived from data points 406 measured during a next measurement window) is ready to send.

Figure 5:
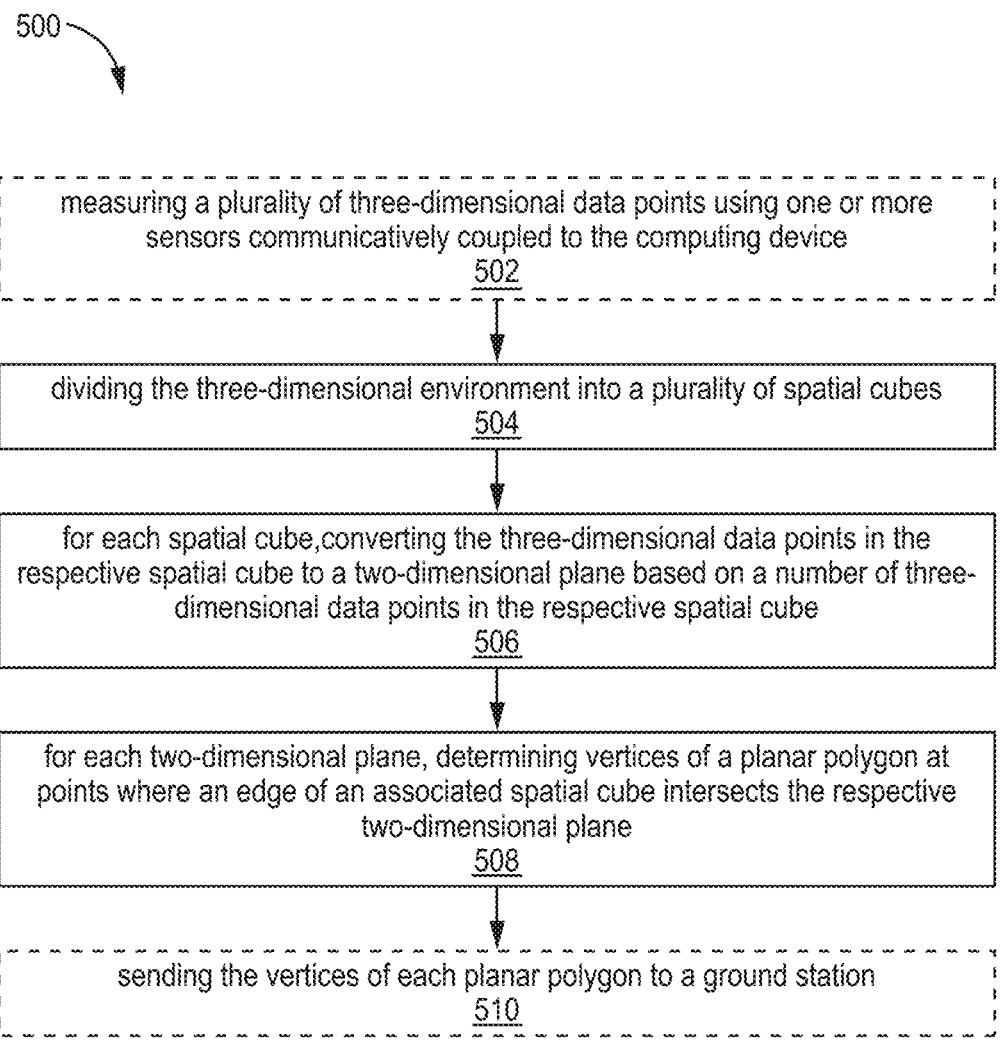
FIG. 5 is a flow diagram illustrating an example method for compressing data points into polygons.

FIG. 5 is a flow diagram illustrating an example method 500 for compressing data points 406 into planar polygons 108. Specifically, the method 500 may be used to compress data points 406 measured during a single measurement window, e.g., one second, multiple seconds, or a fraction of a second long. It should be noted that the method 500 may preferably be performed iteratively, e.g., once per measurement window.

The method 500 may be performed by a computing device 102 that compresses (and optionally measures) data points 406 characterizing a 3D environment, e.g., using a processor executing instructions stored in memory. The computing device 102 may be a component of and/or physically located in an autonomous vehicle, an unmanned vehicle that is remotely controlled from a ground station 116, or a passenger-operated vehicle.

Optionally, the computing device 102 may measure 502 a plurality of three-dimensional data points 406 using one or more sensors 104 communicatively coupled to the computing device 102. Each 3D data point 406 may characterize a point in a 3D environment that surrounds (or is nearby) the computing device 102. The sensor(s) 104 may be part of a light detection and ranging (LIDAR) system or a camera system configured to measure data points 406 in a 3D environment. Each data point 406 may be represented as a vector originating at the sensor(s) 104 and having end coordinates in a Cartesian coordinate system (x,y,z).

Alternatively, the data points 406 may be measured by a device that is physically separate from the computing device 102, then communicated to computing device 102 for compression and, optionally, transmission. For example, a computing device 102, such as a laptop or cellphone, may be communicatively coupled to one or more sensors 104 (e.g., in a different physical housing than the computing device 102) that measure the data points 406. In any case, the data points 406 may be measured and made available for compression at the computing device 102.

The computing device 102 may divide 504 the 3D environment into a plurality of spatial cubes 420, i.e., the computing device 102 may divide the 3D environment into equal-sized spatial cubes 420 such that each measured data point 406 falls into one and only one spatial cube (with the possible exception of data points 406 that are located on a boundary between two spatial cubes 420). Each spatial cube 420 may, therefore, include any number of (e.g., 0-200) data points 406.

The computing device 102 may, for each spatial cube 420, convert 506 the 3D data points in the respective spatial cube 420 to a two-dimensional plane 418 based on a number of 3D data points 406 in the respective spatial cube 420, i.e., a best-fit 2D plane 418. In some configurations, the computing device 102 may approximate a two-dimensional plane 418 only for spatial cubes 420 that include at least a minimum number 435 of data points 406. The minimum number 435 may be user-defined or predefined. Alternatively, if a spatial cube 420 does not include at least a minimum number 435 of data points 406, the computing device 102 may not approximate a two-dimensional plane 418 for the spatial cube 420 and/or may discard the data points 406 in the spatial cube 420.

Each two-dimensional plane 418 may be approximated using a linear least squares algorithm. It should be noted that each two-dimensional plane 418 may not perfectly approximate all the data points 406 in the respective spatial cube 420, but will typically be adequate for representing a surface, e.g., a portion of a wall of tunnel, cave, building, object, etc.

Each two-dimensional plane 418 may extend infinitely in two directions. Accordingly, the computing device 102 may truncate each two-dimensional plane 418 at the boundaries of its associated spatial cube 420, and determine vertices of the resulting planar polygon 108. Specifically, the computing device 102 may, for each two-dimensional plane 418, determine 508 vertices 412 of a planar polygon 108 (lying within the two-dimensional plane 418) at points where an edge of an associated spatial cube 420 intersects the two-dimensional plane 418. In other words, each two-dimensional plane 418 may be associated with exactly one spatial cube 420, and the vertices 412 of a planar polygon 108 within a particular two-dimensional plane 418 may occur where the particular two-dimensional plane 418 is intersected by an edge of the spatial cube 420 it is associated with. Each planar polygon 108 may have anywhere from three to six edges (depending on the geometry), and therefore, three to six vertices 412.

For each measurement window, the number of resulting vertices 112 (of the resulting planar polygons 108) may be far less than the number of data points 406 measured during the measurement window, e.g., by a factor of anywhere from 10-1000. Therefore, that the 3D environment may be represented with far less vertices 112 than measured data points 106.

Optionally, the computing device 102 may then transmit 510 the vertices 412 of each planar polygon 108 (instead of the data points 406), e.g., to a ground station 116. The vertices 412 for each planar polygon 108 may be ordered during transmission to convey a shape of the respective planar polygon 108. In other words, a set of vertices 412 associated with a planar polygon 108 may be connected in different ways to form differently shaped planar polygons 108. To implicitly convey the intended connections between vertices 412, the computing device 102 may order the vertices 412 in a certain way during transmission. For example, the line between the first vertex 412 transmitted and the second vertex 412 transmitted may form a first edge of the planar polygon 108. Similarly, a line between the second vertex 412 transmitted and the third vertex 412 transmitted may form a second edge of the planar polygon 108, and so forth until the last vertex 412 transmitted forms a last edge of the planar polygon 108 when connected with the first vertex 412 transmitted. In other words, each vertex 412 forms an edge of a planar polygon 108 with the vertex 412 transmitted immediately before it and another edge of the planar polygon 108 with the vertex 412 transmitted immediately after it (where the first vertex 412 transmitted for a planar polygon 108 is considered to be transmitted after the last vertex 412 for the planar polygon 108, and the last vertex 412 for the planar polygon 108 is considered to be transmitted before the first vertex 412 for the planar polygon 108, for ordering purposes).

It should also be noted that even though the vertices 412 for a planar polygon 108 may be transmitted in a specific order, the computing device 102 preferably may not compute or transmit an indication of the connectivity between neighboring planar polygons 108. This may produce a faster and more efficient compression than other techniques (e.g., triangulated meshes for 3D data sets) that track and communicate connections between neighboring planar polygons 108.

In some configurations, the ground station 116 may aggregate the received vertices 412 across multiple planar polygons 108 into a single map without an indication, from the computing device 102, of how the multiple planar polygons 108 connect to each other. Alternatively or additionally, the ground station 116 may also aggregate the received vertices 112 across multiple measurement windows to create a real-time (or near real-time) 3D image of the 3D environment surrounding (or near) the computing device 102.

It should be noted that the computing device 102 may transmit the vertices 412 derived from data points 406 measured during a first measurement window before an immediately-following second measurement window has completed. In other words, the computing device 102 may transmit the data derived from a first iteration of measurements (during a measurement window) before the next iteration of measurements have been measured (during a next measurement window). Thus, the computing device 102 may transmit the vertices 412 as fast as the associated data points 406 are measured (with a small, fixed lag for processing). In other words, the computing device 102 may not fall behind while compressing data points 406 over time.

Figure 6:
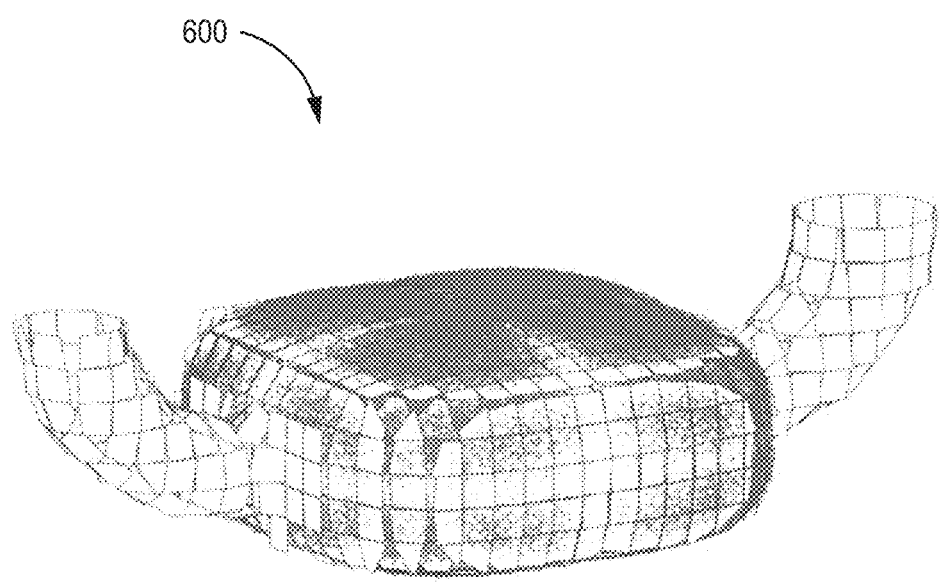
FIG. 6 is a diagram illustrating a 3D representation of a 3D environment.

FIG. 6 is a diagram illustrating a 3D representation 600 of a 3D environment. Specifically, the 3D representation may include a plurality of polygons 108, where three to six vertices 112 associated with each polygon 108 are used to reconstruct each polygon 108. The 3D representation may include polygons 108 from data points 106 measured across multiple measurement windows or a single measurement window.

In one configuration, the 3D representation 600 is generated at a ground station 116 that periodically receives a new set of vertices 112 from a computing device 102. Alternatively, the computing device 102 may generate the 3D representation 600 based on the vertices 112.

Once reconstructed (at a computing device 102 or a ground station 116), the 3D representation may be used to make a safety assessment about the 3D environment associated with the 3D representation 600, e.g., emergency responders may decide whether it is safe enough to travel to (or into) the 3D environment following a natural disaster or other event potentially damaging the structural integrity of the 3D environment. Alternatively, or additionally, a vehicle (e.g., that includes the computing device 102) may navigate the 3D environment (with or without user input) based on the 3D representation 600.

An illustrative example is now described, however, it should be noted that the specific parameters described are merely exemplary and should not be interpreted as limiting. If the sensor(s) 104 measure 300,000 points per second and the measurement window is ⅔ seconds long, after accumulating ⅔ seconds of data (i.e., 200,000 data points 106), the compression module 110 may convert the data points 106 into 1,000 polygons 108 with an average of four vertices 112 per polygon 108. For example, the sensor(s) 104 may be a component of 3 lbs., 8 watt, Velodyne VLP-16 LIDAR.

First, the 200,000 data points 106 may be mapped into a size 128"×256"×64" evidence grid (with 16×32×8 spatial cubes, each being 8"×8"×8" large). A best-fit 2D plane may then be approximated for the data points 106 inside each 8"×8"×8" spatial cube in the evidence grid, if that cube contains at least 20 points. Each resulting 2D plane may be trimmed at the boundaries of its respective 8"×8"×8" spatial cube to produce a polygon 108. Since many of the 16×32×8 (4,096) spatial cubes may not contain any (or may contain less than 20) data points 106, approximately 1,000 polygons 108 may be produced for during the measurement window, each polygon 108 having between three and six vertices 112, e.g., an average of four vertices 112 per polygon 108.

Sending these polygons 108 to the ground station 116 (i.e., transmitting the vertices 112 of the polygons 108) may require a transmit rate of: (8 bits/byte)×(2 bytes/component)×(3 x/y/z components/vertex)×(4 vertices/polygon)×(1000 polygons/second)=192 k bps.

The compression may take ⅓ seconds, so the ⅔ second measurement window plus ⅓ second compression, gives a total of 1 second latency. Therefore, the ground station 116 may append, once per second, a received set of 1,000 polygons 108 (i.e., 1,000 polygons 108 derived from the received vertices 112) into a large map.

Computer System Overview

Configurations of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Figure 7:
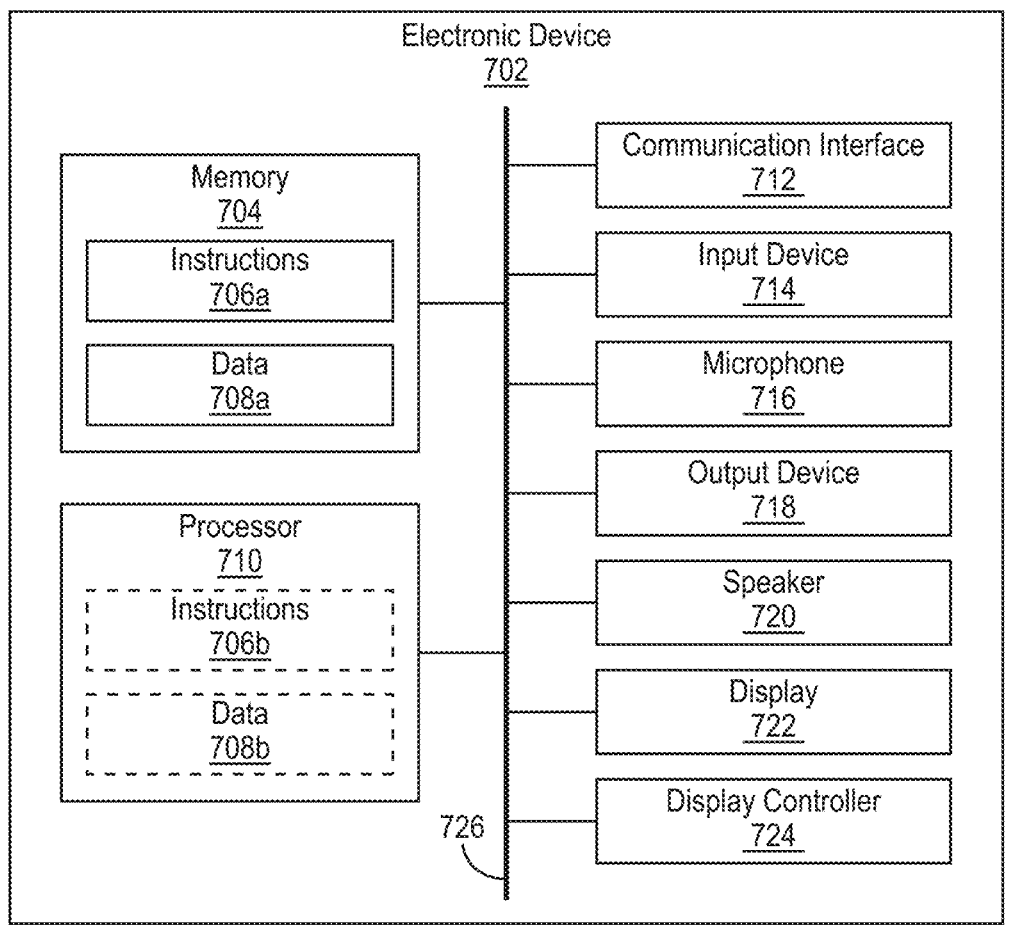
FIG. 7 is a block diagram illustrating an example of an electronic device that may be utilized in some configurations of the present disclosure.

As such, FIG. 7 is a block diagram illustrating an example of an electronic device that may be utilized in some configurations of the present disclosure. The illustrated components may be located within the same physical structure or in separate housings or structures. The computing device 102 and/or the ground system 116 described above may utilize one or more of the electronic devices 702 described in FIG. 7. The electronic device 702 includes a processor 710. The processor 710 may be a general purpose single- or multi-chip microprocessor (e.g., an ARM), a special purpose microprocessor (e.g., a digital signal processor (DSP)), a microcontroller, a programmable gate array, a Field Programmable Gate Array (FGPA), an application specific integrated circuit (ASIC), etc. The processor 710 may be referred to as a central processing unit (CPU). Although just a single processor 710 is shown in the electronic device 702 of FIG. 7, in an alternative configuration, a combination of processors (e.g., an ARM and DSP) could be used.

The electronic device 702 also includes memory 704 in electronic communication with the processor 710. That is, the processor 710 can read information from and/or write information to the memory 704. The memory 704 may be any electronic component capable of storing electronic information. The memory 704 may include a machine-readable medium (also referred to as a computer-readable medium) having stored thereon instructions that may be used to program a computer (or other electronic devices) to perform a process. The machine-readable medium may include, for example, floppy diskettes, optical disks, compact disc read-only memories (CD-ROMs), digital video discs (DVDs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium may be tangible and non-transitory.

Data 708a and instructions 706a may be stored in the memory 704. The instructions 706a may include one or more programs, routines, sub-routines, functions, procedures, etc. The instructions 706a may include a single computer-readable statement or many computer-readable statements. The instructions 706a may be executable by the processor 710 to implement one or more of the methods, functions and procedures described above. Executing the instructions 706a may involve the use of the data 708a that is stored in the memory 704. FIG. 7 shows some instructions 706b and data 708b being loaded into the processor 710 (which may come from instructions 706a and data 708a).

The electronic device 702 may also include one or more communication interfaces 712 for communicating with other electronic devices. The communication interfaces 712 may be based on wired communication technology, wireless communication technology, or both. Examples of different types of communication interfaces 712 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 702 may also include one or more input devices 714 and one or more output devices 718, e.g., used in conjunction with a user interface. Examples of different kinds of input devices 714 include a keyboard, mouse, microphone, camera remote control device, button, touchscreen, etc. For instance, the electronic device 702 may include one or more microphones 716 that convert acoustic signals (e.g., voice, speech) into electrical or electronic signals. In another example, a camera may track position and/or motion of an object and convert the image(s)/video into instructions to control other devices.

Examples of different kinds of output devices 718 include a speaker, printer, etc. For instance, the electronic device 702 may include one or more speakers 720. In one configuration, a speaker 720 may be a transducer that converts electrical or electronic signals into acoustic signals. One specific type of output device which may be typically included in an electronic device 702 is a display device 722. Display devices 722 used with configurations disclosed herein may utilize any suitable image projection technology, such as a cathode ray tube (CRT), liquid crystal display (LCD), light-emitting diode (LED), organic light-emitting diode (OLED), gas plasma, electroluminescence, or the like. A display controller 724 may also be provided, for converting data stored in the memory 704 into text, graphics, and/or moving images (as appropriate) shown on the display device 722.

The various components of the electronic device 702 may be coupled together by one or more buses, which may include a power bus, a control signal bus, a status signal bus, a data bus, etc. For simplicity, the various buses are illustrated in FIG. 7 as a bus system 726. Furthermore, various other architectures and components may be utilized in connection with any electronic device described herein.

Terminology

Brief definitions of terms, abbreviations, and phrases used throughout this application are given below.

The term "determining" may include calculating, computing, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

Also, for the sake of illustration, various configurations of the present disclosure have herein been described in the context of computer programs, physical components, and logical interactions within modern computer networks. Importantly, while these configurations describe various configurations of the present disclosure in relation to modern computer networks and programs, the method and apparatus described herein are equally applicable to other systems, devices, and networks as one skilled in the art will appreciate. As such, the illustrated applications of the configurations of the present disclosure are not meant to be limiting, but instead are examples. Other systems, devices, and networks to which configurations of the present disclosure are applicable include, for example, other types of communication and computer devices and systems. More specifically, configurations are applicable to communication systems, services, and devices such as cell phone networks and compatible devices. In addition, configurations are applicable to all levels of computing from the personal computer to large network mainframes and servers.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

In conclusion, the present disclosure provides novel systems, methods, and arrangements for compressing data points. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a method for compressing three-dimensional data points, the method being performed by a computing device, the method comprising: measuring a plurality of three-dimensional data points using one or more sensors communicatively coupled to the computing device, wherein each three-dimensional data point represents a point in a three-dimensional environment; dividing the three-dimensional environment into a plurality of spatial cubes, wherein each three-dimensional data point is mapped to one spatial cube; for each spatial cube, converting the three-dimensional data points in the respective spatial cube to a two-dimensional plane based on a number of three-dimensional data points in the respective spatial cube; for each two-dimensional plane, determining polygon vertices of a planar polygon at points where an edge of an associated spatial cube intersects the respective two-dimensional plane, wherein a number of polygon vertices for the three-dimensional environment is less than a number of three-dimensional data points measured in the three-dimensional environment; and sending the polygon vertices of each planar polygon to a ground station.

Example 2 includes the method of Example 1, wherein the converting the three-dimensional data points to a two-dimensional plane comprises comparing a number of three-dimensional data points in the respective spatial cube to a threshold, wherein the three-dimensional data points in the respective spatial cube are only converted to a two-dimensional plane when the number of three-dimensional data points in the respective spatial cube is greater than the threshold.

Example 3 includes the method of any of Examples 1-2, wherein the number of polygon vertices for the three-dimensional environment is less, by at least a factor of 10, than the number of three-dimensional data points measured in the three-dimensional environment.

Example 4 includes the method of any of Examples 1-3, wherein the polygon vertices for each planar polygon are ordered during sending to convey a shape of the respective planar polygon.

Example 5 includes the method of any of Examples 1-4, wherein the ground station aggregates polygon vertices associated with multiple planar polygons into a single map without an indication, from the computing device, of how the multiple planar polygons connect to each other.

Example 6 includes the method of any of Examples 1-5, wherein the three-dimensional data points are measured during a first measurement window, wherein the polygon vertices derived from the three-dimensional data points measured during a first measurement window are sent to the ground station before a next measurement window is complete.

Example 7 includes the method of any of Examples 1-6, wherein the three-dimensional environment is underwater, underground, inside a building, or on a city street.

Example 8 includes a computing device for compressing three-dimensional data points, the computing device comprising: at least one sensor configured to measure a plurality of three-dimensional data points, wherein each three-dimensional data point represents a point in a three-dimensional environment; a spatial cube module configured to divide the three-dimensional environment into a plurality of spatial cubes, wherein each three-dimensional data point is mapped to one spatial cube; a least-squares module configured to, for each spatial cube, convert the three-dimensional data points in the respective spatial cube to a two-dimensional plane based on a number of three-dimensional data points in the respective spatial cube; a vertex module configured to, for each two-dimensional plane, determine polygon vertices of a planar polygon at points where an edge of an associated spatial cube intersects the respective two-dimensional plane, wherein a number of polygon vertices for the three-dimensional environment is less than a number of three-dimensional data points measured in three-dimensional environment; and a communication interface configured to send the polygon vertices of each planar polygon to a ground station.

Example 9 includes the computing device of Example 8, wherein the converting the three-dimensional data points to a two-dimensional plane comprises comparing a number of three-dimensional data points in the respective spatial cube to a threshold, wherein the three-dimensional data points in the respective spatial cube are only converted to a two-dimensional plane when the number of three-dimensional data points in the respective spatial cube is greater than the threshold.

Example 10 includes the computing device of any of Examples 8-9, wherein the number of polygon vertices for the three-dimensional environment is less, by at least a factor of 10, than the number of three-dimensional data points measured in the three-dimensional environment.

Example 11 includes the computing device of any of Examples 8-10, wherein the polygon vertices for each planar polygon are ordered during sending to convey a shape of the respective planar polygon.

Example 12 includes the computing device of any of Examples 8-11, wherein the ground station aggregates polygon vertices associated with multiple planar polygons into a single map without an indication, from the computing device, of how the multiple planar polygons connect to each other.

Example 13 includes the computing device of any of Examples 8-12, wherein the three-dimensional data points are measured during a first measurement window, wherein the polygon vertices derived from the three-dimensional data points measured during a first measurement window are sent to the ground station before a next measurement window is complete.

Example 14 includes the computing device of any of Examples 8-13, wherein the three-dimensional environment is underwater, underground, inside a building, or on a city street.

Example 15 includes a computing device for compressing three-dimensional data points, comprising: a processor; memory in electronic communication with the processor; and instructions stored in memory, the instructions being executable to: determine a plurality of three-dimensional data points in a three-dimensional environment; divide the three-dimensional environment into a plurality of spatial cubes, wherein each three-dimensional data point is mapped to one spatial cube; for each spatial cube, convert the three-dimensional data points in the respective spatial cube to a two-dimensional plane based on a number of three-dimensional data points in the respective spatial cube; for each two-dimensional plane, determining polygon vertices of a planar polygon at points where an edge of an associated spatial cube intersects the respective two-dimensional plane, wherein a number of polygon vertices for the three-dimensional environment is less than a number of three-dimensional data points measured in three-dimensional environment; and send the polygon vertices of each planar polygon to a ground station.

Example 16 includes the computing device of Example 15, wherein the converting the three-dimensional data points to a two-dimensional plane comprises comparing a number of three-dimensional data points in the respective spatial cube to a threshold, wherein the three-dimensional data points in the respective spatial cube are only converted to a two-dimensional plane when the number of three-dimensional data points in the respective spatial cube is greater than the threshold.

Example 17 includes the computing device of any of Examples 15-16, wherein the number of polygon vertices for the three-dimensional environment is less, by at least a factor of 10, than the number of three-dimensional data points measured in the three-dimensional environment.

Example 18 includes the computing device of any of Examples 15-17, wherein the polygon vertices for each planar polygon are ordered during sending to convey a shape of the respective planar polygon.

Example 19 includes the computing device of any of Examples 15-18, wherein the ground station aggregates polygon vertices associated with multiple planar polygons into a single map without an indication, from the computing device, of how the multiple planar polygons connect to each other.

Example 20 includes the computing device of any of Examples 15-19, wherein the three-dimensional data points are measured during a first measurement window, wherein the polygon vertices derived from the three-dimensional data points measured during a first measurement window are sent to the ground station before a next measurement window is complete.

What is claimed is:

1. A method for compressing three-dimensional data points, the method being performed by a computing device, the method comprising:
   measuring a plurality of three-dimensional data points using one or more sensors communicatively coupled to the computing device, wherein each three-dimensional data point represents a point in a three-dimensional environment;
   dividing the three-dimensional environment into a plurality of spatial cubes, wherein each three-dimensional data point is mapped to one spatial cube;
   for each spatial cube, converting the three-dimensional data points in the respective spatial cube to a two-dimensional plane based on a number of three-dimensional data points in the respective spatial cube;
   for each two-dimensional plane, determining polygon vertices of a planar polygon at points where an edge of an associated spatial cube intersects the respective two-dimensional plane, wherein a number of polygon vertices for the three-dimensional environment is less than a number of three-dimensional data points measured in the three-dimensional environment; and sending the polygon vertices of each planar polygon to a ground station.

2. The method of claim 1, wherein the converting the three-dimensional data points to a two-dimensional plane comprises comparing a number of three-dimensional data points in the respective spatial cube to a threshold, wherein the three-dimensional data points in the respective spatial cube are only converted to a two-dimensional plane when the number of three-dimensional data points in the respective spatial cube is greater than the threshold.

3. The method of claim 1, wherein the number of polygon vertices for the three-dimensional environment is less, by at least a factor of 10, than the number of three-dimensional data points measured in the three-dimensional environment.

4. The method of claim 1, wherein the polygon vertices for each planar polygon are ordered during sending to convey a shape of the respective planar polygon.

5. The method of claim 1, wherein the ground station aggregates polygon vertices associated with multiple planar polygons into a single map without an indication, from the computing device, of how the multiple planar polygons connect to each other.

6. The method of claim 1, wherein the three-dimensional data points are measured during a first measurement window, wherein the polygon vertices derived from the three-dimensional data points measured during a first measurement window are sent to the ground station before a next measurement window is complete.

7. The method of claim 1, wherein the three-dimensional environment is underwater, underground, inside a building, or on a city street.

8. A computing device for compressing three-dimensional data points, the computing device comprising:
   at least one sensor configured to measure a plurality of three-dimensional data points, wherein each three-dimensional data point represents a point in a three-dimensional environment;
   a spatial cube module configured to divide the three-dimensional environment into a plurality of spatial cubes, wherein each three-dimensional data point is mapped to one spatial cube;
   a least-squares module configured to, for each spatial cube, convert the three-dimensional data points in the respective spatial cube to a two-dimensional plane based on a number of three-dimensional data points in the respective spatial cube;
   a vertex module configured to, for each two-dimensional plane, determine polygon vertices of a planar polygon at points where an edge of an associated spatial cube intersects the respective two-dimensional plane, wherein a number of polygon vertices for the three-dimensional environment is less than a number of three-dimensional data points measured in the three-dimensional environment; and
   a communication interface configured to send the polygon vertices of each planar polygon to a ground station.

9. The computing device of claim 8, wherein the converting the three-dimensional data points to a two-dimensional plane comprises comparing a number of three-dimensional data points in the respective spatial cube to a threshold, wherein the three-dimensional data points in the respective spatial cube are only converted to a two-dimensional plane when the number of three-dimensional data points in the respective spatial cube is greater than the threshold.

10. The computing device of claim 8, wherein the number of polygon vertices for the three-dimensional environment is less, by at least a factor of 10, than the number of three-dimensional data points measured in the three-dimensional environment.

11. The computing device of claim 8, wherein the polygon vertices for each planar polygon are ordered during sending to convey a shape of the respective planar polygon.

12. The computing device of claim 8, wherein the ground station aggregates polygon vertices associated with multiple planar polygons into a single map without an indication, from the computing device, of how the multiple planar polygons connect to each other.

13. The computing device of claim 8, wherein the three-dimensional data points are measured during a first measurement window, wherein the polygon vertices derived from the three-dimensional data points measured during a first measurement window are sent to the ground station before a next measurement window is complete.

14. The computing device of claim 8, wherein the three-dimensional environment is underwater, underground, inside a building, or on a city street.

15. A computing device for compressing three-dimensional data points, comprising:
   a processor;
   memory in electronic communication with the processor; and
   instructions stored in memory, the instructions being executable to:
      determine a plurality of three-dimensional data points in a three-dimensional environment;
      divide the three-dimensional environment into a plurality of spatial cubes, wherein each three-dimensional data point is mapped to one spatial cube;
      for each spatial cube, convert the three-dimensional data points in the respective spatial cube to a two-dimensional plane based on a number of three-dimensional data points in the respective spatial cube;
      for each two-dimensional plane, determining polygon vertices of a planar polygon at points where an edge of an associated spatial cube intersects the respective two-dimensional plane, wherein a number of polygon vertices for the three-dimensional environment is less than a number of three-dimensional data points measured in the three-dimensional environment; and
      send the polygon vertices of each planar polygon to a ground station.

16. The computing device of claim 15, wherein the converting the three-dimensional data points to a two-dimensional plane comprises comparing a number of three-dimensional data points in the respective spatial cube to a threshold, wherein the three-dimensional data points in the respective spatial cube are only converted to a two-dimensional plane when the number of three-dimensional data points in the respective spatial cube is greater than the threshold.

17. The computing device of claim 15, wherein the number of polygon vertices for the three-dimensional environment is less, by at least a factor of 10, than the number of three-dimensional data points measured in the three-dimensional environment.

18. The computing device of claim 15, wherein the polygon vertices for each planar polygon are ordered during sending to convey a shape of the respective planar polygon.

19. The computing device of claim 15, wherein the ground station aggregates polygon vertices associated with multiple planar polygons into a single map without an indication, from the computing device, of how the multiple planar polygons connect to each other.

20. The computing device of claim 15, wherein the three-dimensional data points are measured during a first measurement window, wherein the polygon vertices derived from the three-dimensional data points measured during a first measurement window are sent to the ground station before a next measurement window is complete.

* * * * *